(12) United States Patent
Kubono et al.

(10) Patent No.: US 8,195,708 B2
(45) Date of Patent: Jun. 5, 2012

(54) INFORMATION RETAINING APPARATUS, INFORMATION PROCESSING SYSTEM, INFORMATION PROCESSING METHOD AND PROGRAM

(75) Inventors: Fumio Kubono, Tokyo (JP); Yoshihito Ishibashi, Tokyo (JP); Mamoru Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 455 days.

(21) Appl. No.: 12/244,128

(22) Filed: Oct. 2, 2008

(65) Prior Publication Data

US 2009/0106316 A1    Apr. 23, 2009

(30) Foreign Application Priority Data

Oct. 23, 2007 (JP) ................ P2007-275740

(51) Int. Cl.
*G06F 17/30* (2006.01)
(52) U.S. Cl. ........................ 707/802; 707/803
(58) Field of Classification Search ........... 707/999.101, 707/999.102, 802, 803
See application file for complete search history.

(56) References Cited

U.S. PATENT DOCUMENTS 7,519,726 B2 * 4/2009 Palliyil et al. .............. 709/232

FOREIGN PATENT DOCUMENTS

| JP | 2-95464 | 7/1990 |
|---|---|---|
| JP | 2-275598 | 11/1990 |
| JP | 4-184596 | 7/1992 |
| JP | 6-24191 | 2/1994 |
| JP | 6-212841 | 8/1994 |
| JP | 7-93487 | 4/1995 |
| JP | 10-31698 | 2/1998 |
| JP | 11-136720 | 5/1999 |
| JP | 11-338981 | 12/1999 |
| JP | 2001-67365 | 3/2001 |
| JP | 2002-319044 | 10/2002 |
| JP | 2003-30603 | 1/2003 |
| JP | 2003-69511 | 3/2003 |
| JP | 2003-132256 | 5/2003 |
| JP | 2003-141605 | 5/2003 |
| JP | 2005-100272 | 4/2005 |
| JP | 2007-206882 | 8/2007 |

OTHER PUBLICATIONS

The machine translation of JP2005-100272, Sugiyama Kazuo, Apr. 14, 2005, pp. 1-23.*
Notification of Reasons for Refusal in corresponding Japanese Patent Application No. 2007-275740 and English-language translation thereof.

* cited by examiner

*Primary Examiner* — Monica Pyo
(74) *Attorney, Agent, or Firm* — Finnegan, Henderson, Farabow, Garrett & Dunner, L.L.P.

(57) ABSTRACT

An information retaining apparatus of the present invention has a storage unit which retains a plurality of information, an input unit which receives an input from a user, and a determination processing unit which extracts at least some of the plurality of information stored in the storage unit so as to display it according to the input from the input unit or the determination information transmitted from an information processing apparatus connected to the information retaining apparatus via a communication medium and process the information based on the expiration dates of the extracted information and attribute information of the information.

12 Claims, 5 Drawing Sheets

| MEMORY NUMBER | FACILITY INFORMATION | EQUIPMENT INFORMATION | EXPIRATION DATE | AVAILABILITY | ATTRIBUTE |
|---|---|---|---|---|---|
| 001 | FACILITY 1 | EQUIPMENT 1 | DATE1 | AVAILABILITY 1 | ATTRIBUTE 1 |
| 002 | FACILITY 2 | EQUIPMENT 2 | DATE2 | AVAILABILITY 2 | ATTRIBUTE 2 |
| 003 | FACILITY 3 | EQUIPMENT 3 | DATE3 | AVAILABILITY 3 | ATTRIBUTE 3 |
| ⋮ | ⋮ | ⋮ | ⋮ | ⋮ | ⋮ |

FIG.2

| MEMORY NUMBER | FACILITY INFORMATION | EQUIPMENT INFORMATION | EXPIRATION DATE | AVAILABILITY | ATTRIBUTE |
|---|---|---|---|---|---|
| 001 | FACILITY 1 | EQUIPMENT 1 | DATE1 | AVAILABILITY 1 | ATTRIBUTE 1 |
| 002 | FACILITY 2 | EQUIPMENT 2 | DATE2 | AVAILABILITY 2 | ATTRIBUTE 2 |
| 003 | FACILITY 3 | EQUIPMENT 3 | DATE3 | AVAILABILITY 3 | ATTRIBUTE 3 |
| ⋮ | ⋮ | ⋮ | ⋮ | ⋮ | ⋮ |

Fig.3A

| FACILITY INFORMATION | EQUIPMENT INFORMATION | EXPIRATION DATE | AVAILABILITY | ATTRIBUTE |
|---|---|---|---|---|
| FACILITY A | EQUIPMENT X | DATE 1 | 1 | 1 |
| FACILITY A | EQUIPMENT Y | DATE 3 | 1 | 1 |
| FACILITY B | EQUIPMENT Z | DATE 2 | 1 | 2 |

Fig.3B

| FACILITY INFORMATION | EQUIPMENT INFORMATION | EXPIRATION DATE | AVAILABILITY | ATTRIBUTE |
|---|---|---|---|---|
| FACILITY A | EQUIPMENT X | DATE 1 | 1 | 1 |
| FACILITY B | EQUIPMENT Z | DATE 2 | 1 | 2 |
| FACILITY A | EQUIPMENT Y | DATE 3 | 1 | 1 |

Fig.3C

| FACILITY INFORMATION | EQUIPMENT INFORMATION | EXPIRATION DATE | AVAILABILITY | ATTRIBUTE |
|---|---|---|---|---|
| FACILITY A | EQUIPMENT X | DATE 1 | 0 | 1 |
| FACILITY A | EQUIPMENT Y | DATE 3 | 1 | 1 |
| FACILITY B | EQUIPMENT Z | DATE 2 | 1 | 2 |

Fig.3D

| FACILITY INFORMATION | EQUIPMENT INFORMATION | EXPIRATION DATE | AVAILABILITY | ATTRIBUTE |
|---|---|---|---|---|
| FACILITY A | EQUIPMENT X | DATE 1 | 0 | 1 |
| FACILITY A | EQUIPMENT Y | DATE 3 | 1 | 1 |

| | FACILITY INFORMATION | EQUIPMENT INFORMATION | EXPIRATION DATE | AVAILABILITY | ATTRIBUTE |
|---|---|---|---|---|---|
| Fig.4A | FACILITY A | EQUIPMENT Y | DATE3 | 1 | 1 |
| | FACILITY B | EQUIPMENT Z | DATE2 | 1 | 2 |

| | FACILITY INFORMATION | EQUIPMENT INFORMATION | EXPIRATION DATE | AVAILABILITY | ATTRIBUTE |
|---|---|---|---|---|---|
| Fig.4B | FACILITY A | EQUIPMENT X | DATE1 | 0 | 1 |
| | FACILITY A | EQUIPMENT Y | DATE3 | 1 | 1 |
| | FACILITY B | EQUIPMENT Z | DATE2 | 1 | 2 |

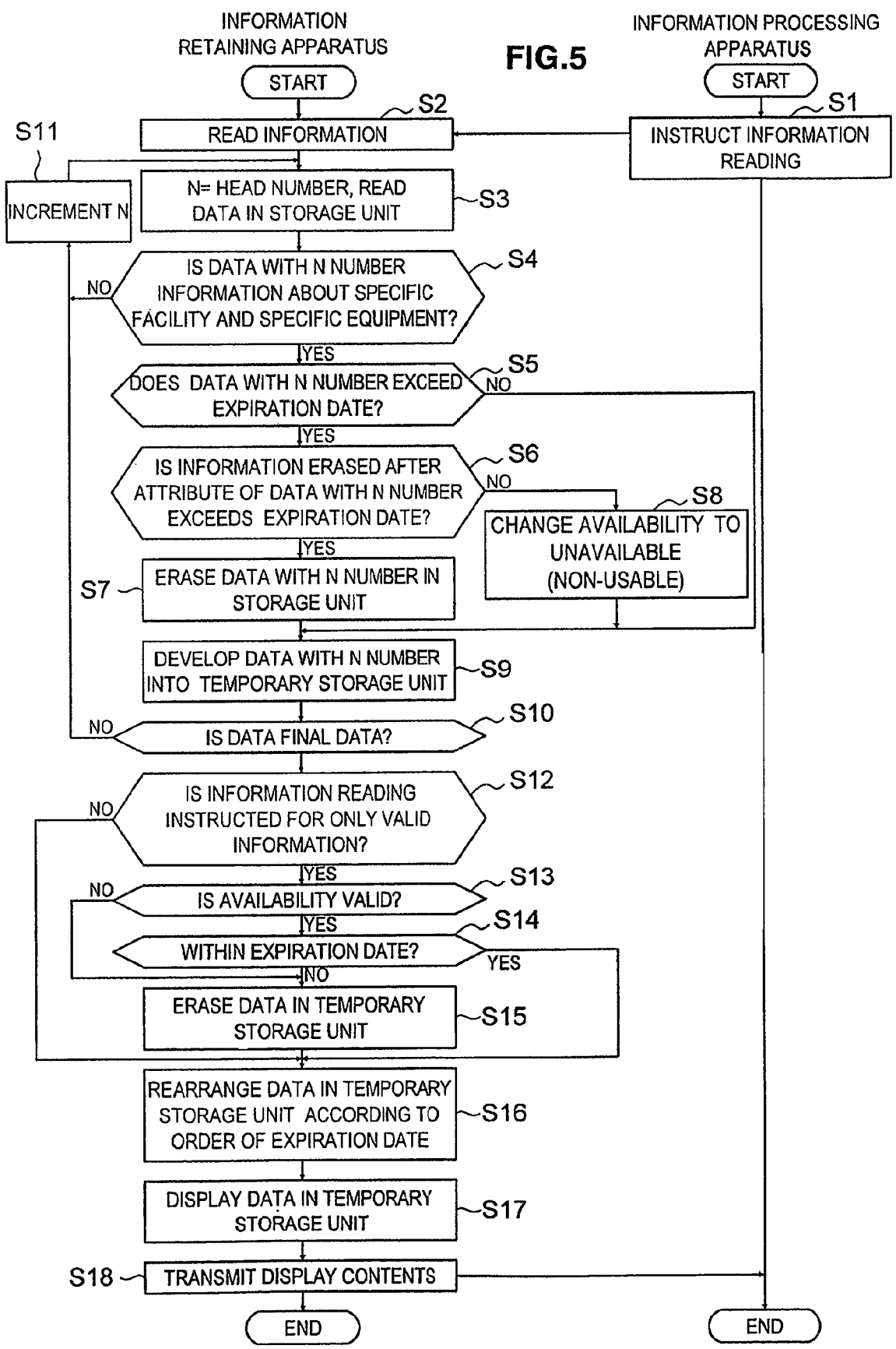

INFORMATION RETAINING APPARATUS, INFORMATION PROCESSING SYSTEM, INFORMATION PROCESSING METHOD AND PROGRAM

CROSS REFERENCES TO RELATED APPLICATIONS

The present invention contains subject matter related to Japanese Patent Application JP 2007-275740 filed in the Japan Patent Office on Oct. 23, 2007, the entire contents of which being incorporated herein by reference.

BACKGROUND OF THE INVENTION

1. Field of the Invention

The present invention relates to an information retaining apparatus, an information processing system, information processing method and program.

2. Description of the Related Art

Recently, in various scenes such as time of purchasing products and time of using vehicles such as railways, information recording media such as IC card (information retaining apparatuses) are widely used. For example, Japanese Patent Application Laid-Open No. 2-275598 (Patent Document 1) describes that a state whether a card-type recording medium is within expiration date is output based on a result of comparing valid data and a current date.

Japanese Patent Application Laid-Open No. 2003-141605 (Patent Document 2) describes that an automatic dealing apparatus reads the expiration date of an IC card from an IC chip so as to present the expiration date to a user.

SUMMARY OF THE INVENTION

However, a plurality of information stored in an information retaining apparatus such as an IC card can be hardly effectively utilized only by determining validity of information based on an expiration date unlike the related technique. For example, it is assumed that even information which exceeds its expiration date can be reused according to a change in a situation. It is difficult to reuse information according to the change in a situation only by determining the validity of the information based on the expiration date unlike the related technique.

Recently, it is assumed that a plurality of different information is stored in the information retaining apparatus such as an IC card according to diversification of information. For example, information relating to different facilities such as railway stations, shopping centers and amusement parks is stored in one IC card. Further, information relating to a plurality of equipment in these facilities is stored in the information retaining apparatus. In such an information retaining apparatus which stores various types of information therein, when expiration dates are set for respective information, availability of the equipment and facilities is determined according to the expiration dates.

However, when various information is stored in the information retaining apparatus, information to be actually used by a user in the various information changes according to use scenes. Therefore, when the validity of a lot of information is determined based on only the expiration dates, a process is very complicated when the validity of a lot of information is determined.

It is desirable for the present invention to provide an information retaining apparatus, an information processing system, information processing method and program which accurately determine validity of information in a lot of information stored in the information retaining apparatus according to use scenes so as to heighten convenience of information use, and are new and improved.

According to an embodiment of the present invention, there is provided an information retaining apparatus including: a storage unit which retains a plurality of information with expiration dates; and a determination processing unit which extracts at least some of the plurality of information retained in the storage unit so as to display it according to determination information input by a user or determination information transmitted from an information processing apparatus connected to the information retaining apparatus via a communication medium, and processes the extracted information based on the expiration dates and accompanying attribute information.

According to the above constitution, a plurality of information with expiration dates is retained in the storage unit, and at least some of the plurality of information retained in the storage unit is extracted to be displayed according to determination information input from the input unit or determination information transmitted from the information processing apparatus connected to the information retaining apparatus via the communication medium. The extracted information is processed based on the expiration dates and accompanying attribute information. The extracted information is processed based on the expiration dates and accompanying attribute information. Therefore, only information corresponding to the determination information in the various information stored in the information retaining apparatus can be extracted for display. Since the extracted information is processed based on the expiration dates and the attribute information, only information within the expiration dates can be displayed, or information which exceeds the expiration dates can be allowed to remain in the storage unit or can be erased suitably.

A display unit which executes display based on the processed result of the determination processing unit may be provided. According to such a constitution, a user of the information processing apparatus can visually checks the processed result in the determination processing unit.

The determination processing unit may execute a process for displaying the information. According to such a constitution, a determination can be made whether the information extracted based on the determination information is displayed based on the expiration dates.

The determination processing unit may determine an order of display based on the expiration dates of the information. According to such a constitution, since the order of the display is determined based on the expiration dates of the information, the information can be recognized in order of the expiration dates.

The determination processing unit may execute the process so that information which exceeds their expiration dates in the information extracted according to the determination information is not displayed. According to such a constitution, since the information which exceeds the expiration dates in the extracted information is not displayed, only valid information can be displayed.

The determination processing unit may execute a process for displaying an alert when a current date reaches predetermined periods within the expiration dates of the information. According to such a constitution, when a current date reaches predetermined periods within the expiration dates of the information, an alert is displayed. For this reason, coming of the expiration dates can be recognized in advance.

The determination processing unit may change a storage state of the information in the storage unit according to the information processed result. According to such a constitution, since the storage state of the information in the storage unit is changed according to the information processed result, information which exceeds the expiration dates can be erased from the storage unit or can be allowed to remain in the storage unit.

The determination processing unit may determine whether information which exceeds their expiration date expires is allowed to remain in the storage unit based on the attribute information. According to such a constitution, the determination is made whether the information which exceeds their expiration dates is allowed to remain in the storage unit based on the attribute information. For this reason, when the attribute information is set so that the information which exceeds the expiration dates is allowed to remain in the storage unit, the information can be reused.

A communication unit which transmits the processed result in the determination processing unit to the information processing apparatus may be provided. According to such a constitution, since the processed result in the determination processing unit is transmitted to the information processing apparatus, the processed result can be displayed on the display unit of the information processing apparatus.

The plurality of information may include information about equipment where the information retaining apparatus can be used. According to such a constitution, only information about equipment where the information retaining apparatus can be used can be extracted based on the determination information.

According to another embodiment of the present invention, there is provided an information processing system in which an information retaining apparatus and an information processing apparatus are connected via a transmittable/receivable communication medium, wherein the information retaining apparatus includes: a communication unit which communicates with the information processing apparatus via the communication medium; a storage unit which retains a plurality of information with expiration dates; and a determination processing unit which extracts at least some of the plurality of information retained in the storage unit so as to display it according to determination information transmitted from the information processing apparatus, and processes the extracted information based on the expiration dates and accompanying attribute information, the information processing apparatus includes: a request unit which generates the determination information; and a communication unit which transmits the determination information to the information retaining apparatus.

According to the above constitution, in the information processing system in which the information retaining apparatus and the information processing apparatus are connected via the transmittable/receivable communication medium, the communication unit of the information retaining apparatus communicates with the information processing apparatus via the communication medium. A plurality of information with expiration dates is retained in the storage unit. At least some of the plurality of information retained in the storage unit is extracted for display according to the determination information transmitted from the information processing apparatus, and the information is processed based on the expiration dates and accompanying attribute information. The request unit of the information processing apparatus generates the determination information, and the communication unit transmits the determination information to the information retaining apparatus. Therefore, only the information corresponding to the determination information in various information stored in the information retaining apparatus can be processed. Since the extracted information is processed based on the expiration dates and the attribute information, only information within the expiration dates can be displayed, information which exceeds the expiration dates can be allowed to remain in the storage unit or can be erased suitably.

The communication unit of the information processing apparatus may receive the processed result of the determination processing unit from the information retaining apparatus, and the information processing apparatus may have a display unit which executes display according to the processed result of the determination processing unit. According to such a constitution, the processed result in the determination processing apparatus can be displayed on the display unit of the information processing apparatus.

According to another embodiment of the present invention, there is provided an information processing method in an information retaining apparatus retaining a plurality of information, including the steps of: retaining a plurality of information with expiration dates in a storage unit; receiving an input from a user; and extracting at least some of the plurality of information retained in the storage unit to display it according to determination information input by the user or determination information transmitted from an information processing apparatus connected to the information retaining apparatus via a communication medium, and processing the extracted information based on the expiration dates and accompanying attribute information.

According to the above constitution, in the information processing method in an information retaining apparatus retaining a plurality of information, a plurality of information with expiration dates is retained in a storage unit, and at least some of the plurality of information retained in the storage unit is extracted for display according to determination information input by a user or determination information transmitted from the information processing apparatus connected to the information retaining apparatus via the communication medium. The extracted information is processed based on the expiration dates and accompanying attribute information. Therefore, only information corresponding to the determination information in various information stored in the information retaining apparatus can be processed. Since the extracted information is processed based on the expiration dates and the attribute information, only information within the expiration dates can be displayed, or information which exceeds the expiration dates can be allowed to remain or can be erased suitably.

According to another embodiment of the present invention, there is provided a program in an information retaining apparatus retaining a plurality of information which allows the information retaining apparatus to function as: a unit retaining a plurality of information with expiration dates in a storage unit; and a unit extracting at least some of the plurality of information retained in the storage unit to display it according to determination information input by a user or determination information transmitted from an information processing apparatus connected to the information retaining apparatus via a communication medium, and processing the extracted information based on the expiration dates and accompanying attribute information.

According to the above constitution, in the program in the information retaining apparatus retaining a plurality of information, a plurality of information with expiration dates is retained in the storage unit. At least some of the plurality of information retained in the storage unit is extracted for display according to determination information input by a user or determination information transmitted from the information processing apparatus connected to the information retaining apparatus via the communication medium. The extracted information is processed based on the expiration dates of the extracted information and the attribute information of the information. Therefore, only information corresponding to the determination information in the various information stored in the information retaining apparatus can be processed. Since the extracted information is processed based on the expiration dates and the attribute information, only information within the expiration dates can be displayed, or information which exceeds the expiration dates can be allowed to remain in the storage unit or can be erased suitably.

According to the present invention, validity of information in a lot of information stored in the information retaining apparatus can be accurately determined according to use scenes, and convenience of information use can be heightened.

BRIEF DESCRIPTION OF THE DRAWINGS

FIG. 2 is a pattern diagram illustrating an example of a data structure stored in a storage unit of an information retaining apparatus;

FIGS. 3A to 3D are pattern diagrams illustrating information extracted in a temporary storage unit of a determination processing unit based on a request from a request unit of the information processing apparatus or a request input from an input unit of the information processing apparatus;

FIGS. 4A and 4B are pattern diagrams illustrating information to be displayed on a display unit; and FIG. 5 is a flow chart illustrating a procedure of a process in the information processing system according to one embodiment of the present invention.

DETAILED DESCRIPTION OF THE PREFERRED EMBODIMENTS

Figure 1:
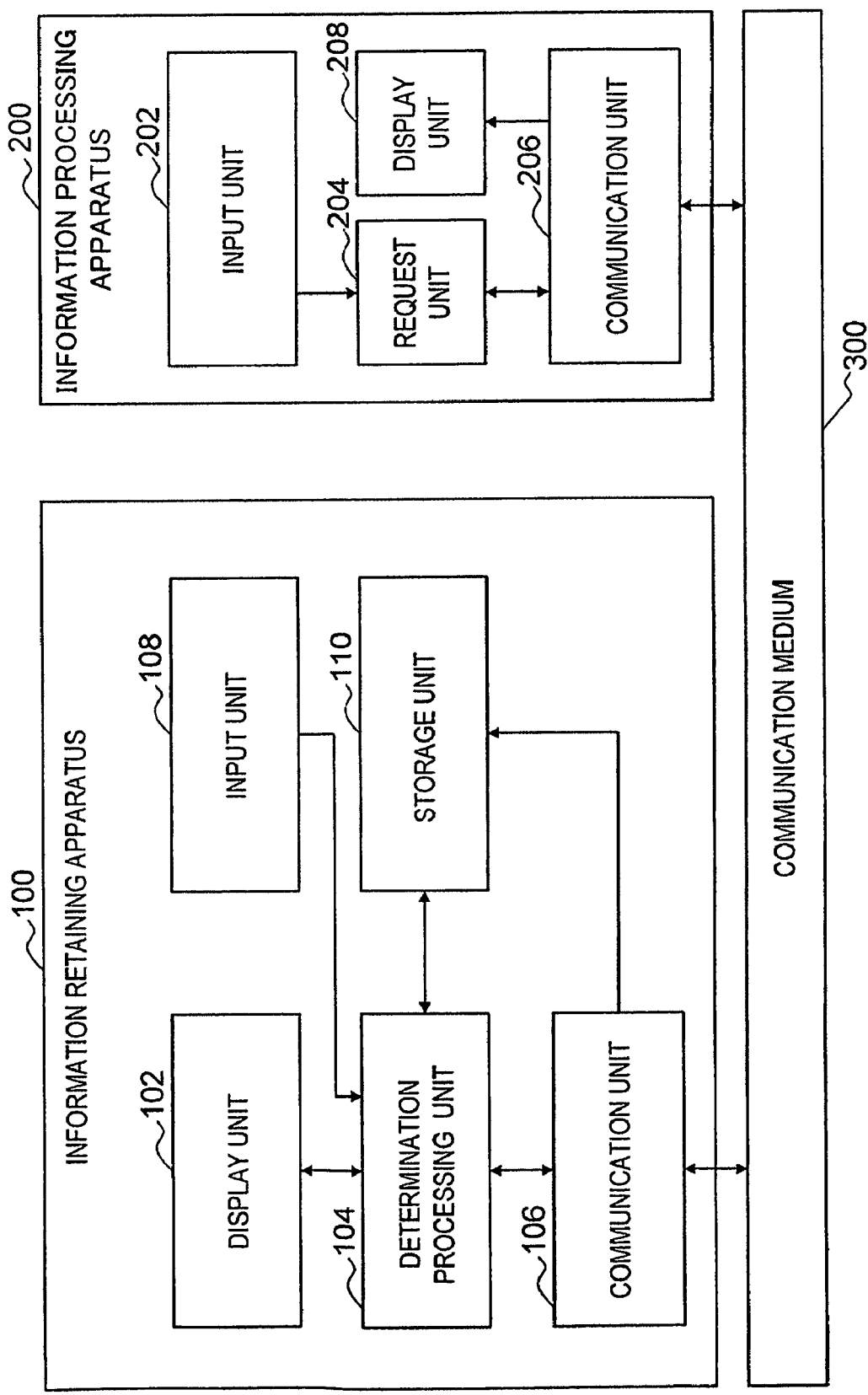
FIG. 1 is a pattern diagram illustrating a constitution of an information processing system according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is a pattern diagram illustrating a constitution of an information processing system according to one embodiment of the present invention. In the system shown in FIG. 1, an information retaining apparatus 100 and an information processing apparatus 200 are connected to each other via a communication medium 300.

The information retaining apparatus 100 includes a display unit 102, a determination processing unit 104, a communication unit 106, an input unit 108 and a storage unit 110. One example of the information retaining apparatus 100 includes an IC card and a mobile telephone which can display stored information.

The information processing apparatus 200 can read information from the information retaining apparatus 100 and can write information into the information retaining apparatus 100. The information processing apparatus 200 includes an input unit 202, a request unit 204, a communication unit 206 and a display unit 208. One example of the information processing apparatus 200 is a reader/writer (R/W) which can read information from an IC card or the like and can write information into an IC card or the like.

The communication medium 300 includes a wireless or wired medium and a medium adopting a dielectric (human body device). However, the communication medium 300 is not particularly limited as long as it can transmit information between the information retaining apparatus 100 and the information processing apparatus 200. Signals which are treated by the communication medium 300 may be electric signals or light signals, and an optimum communication medium can be used according to signals to be treated.

This embodiment describes an example where the information processing apparatus is applied to use of specific equipment in a specific facility. When specific equipment is used, the information retaining apparatus 100 held by a user is made to communicate with the information processing apparatus 200 installed in the specific equipment, and determines whether expiration date information, which is related with the specific equipment and is included in a lot of information retained by the information retaining apparatus 100, is valid. When expiration date information is valid, the information retaining apparatus 100 is allowed to be used in the specific equipment. When the expiration date is no longer valid, the information retaining apparatus 100 is not allowed to be used.

The storage unit 110 of the information retaining apparatus 100 is, for example, a non-volatile memory, and stores various information retained by the information retaining apparatus 100 therein. FIG. 2 is a pattern diagram illustrating an example where a data structure stored in the storage unit 100. As shown in FIG. 2, the storage unit 110 stores respective information such as facility information (facility 1, facility 2, facility 3, ... ), equipment information (equipment 1, equipment 2, equipment 3, ... ), expiration date (date 1, date 2, date 3, ... ), availability information (availability 1, availability 2, availability 3, ... ), and attribute information (attribute 1, attribute 2, attribute 3, ... ) corresponding to respective memory numbers. Arrangements of the facility information, the equipment information, the expiration information, the availability information and the attribute information can be specified on the storage unit 110 by the memory numbers.

The facility information is information about facilities where the information retaining apparatus 100 can be used. Examples of the facility information are a railway station, a shopping center and an amusement park. The equipment information is information about equipment which can be used in the facilities. Examples of the equipment information are automatic ticket gates in a railway station yard, stores in a station yard, stores in a shopping center, and attractions in an amusement park.

The expiration dates represent expiration dates set for respective equipment in respective facilities until which the information retaining apparatus 100 can be used. For example, the date 1 shown in FIG. 2 represents an expiration date until which the information retaining apparatus 100 can be used in the equipment 1 in the facility 1. In the following description, the expiration date is described as the date until which the information retaining apparatus 100 can be used. However, the expiration date may be such that the information retaining apparatus 100 can be hardly used until the expiration date and can be used after the expiration date. In the data structure shown in FIG. 2, the available facilities and equipment are retained in a recording order regardless of the expiration dates.

The availability information represents whether the information retaining apparatus 100 can be used for the facilities and the equipment based on a current date and the expiration dates. In this embodiment, when the availability information indicates 0, corresponding facility and equipment are made to be unavailable. When the availability information indicates 1, the corresponding facility and equipment can be used. Availability can be determined based on the availability information without seeing the expiration date, but the availability may be determined based on the expiration date and a current date every time of use. In this embodiment, the availability information represents the availability based on the expiration dates, but it may represent availability based on another information such as information about a place where the information retaining apparatus 100 is used. For example, when the information retaining apparatus 100 is an IC card (an e-money card) which retains points (or money) with which products can be purchased, the availability information may represent whether the points can be used according to facilities and equipment. When the information retaining apparatus 100 is used in an automatic ticket gate in a railway station, the availability information may represent availability according to information about types of lines and mutual entry.

The attribute information is information representing treatment of corresponding data after the expiration date, namely, represents whether the data is allowed to remain so as to be capable of being displayed after the expiration date or the data is completed erased after the expiration date. In this embodiment, when the attribute indicates 0, corresponding data is allowed to remain so as to be capable of being displayed on the storage unit 110 after the expiration date. When the attribute indicates 1, corresponding data is erased from the storage unit 110 after the expiration date. In this embodiment, the attribute information is information related to the expiration dates, but the attribute information may be information representing validity/invalidity of the information (service) when a specific condition is established, and may be information other than the information about expiration dates.

The request unit 204 of the information processing apparatus 200 requests an instruction in extracting which information in the information stored in the storage unit 110 (determination information). A signal of the determination information generated by the request unit 240 is given to the communication medium 300 via the communication unit 206. The determination information generated by the request unit 204 can be generated and changed based on the information of the input unit 202. The signal of the determination information is transmitted to the communication medium 300 so as to be received by the communication unit 106 of the information retaining apparatus 100. Specific facility information and specific equipment information are attached to the determination information. Further, information relating to expiration dates (current dates or the like) is attached to the determination information.

The determination processing unit 104 of the information retaining apparatus 100 can be composed of an arithmetic processing unit such as CPU. A program which operates the determination processing unit 104 can be stored in a memory of the information retaining apparatus 100. The determination processing unit 104 compares a request from the request unit 204 or a request input from the input unit 108 with information stored in the storage unit 110 so as to extract the information corresponding to the request from the storage unit 110. Concretely, the determination processing unit 104 extracts information corresponding to specific facility information and specific equipment information included in the determination information from the storage unit 110, and temporarily develops the information extracted in a temporary storage unit (temporary area) provided to the determination processing unit 104. The temporary storage unit of the determination processing unit 104 can specify facility information, equipment information, expiration dates, availability information and attribute information based on memory numbers similarly to the data structure in the storage unit 110 shown in FIG. 2. In the following description, the temporary storage unit is provided to the determination processing unit 104, but it may be provided to the storage unit 110.

The information retaining apparatus 100 may develop information corresponding to specific facility information and specific equipment information into the temporary storage unit of the determination processing unit 104 according to an input (determination information) from the input unit 108.

The determination processing unit 104 processes information about a current date included in the determination information transmitted from the information processing apparatus, information about a current date input from the input unit 108 or expiration date information retained in the storage unit 110 in the information extracted into the temporary storage unit according to attribute information. The determination processing unit 104 changes data in the storage unit 110 as the need arises. The determination processing unit 104 further extracts data relating to display from the information extracted in the temporary storage unit based on the processed result, so as to display the extracted data on the display unit 102.

The determination processing unit 104 transmits the information extracted in the temporary storage unit from the communication unit 106 via the communication medium 300 to the information processing apparatus 200. The transmitted information is received by the communication unit 206 of the information processing apparatus 200, and displayed on the display unit 208. When the communication between the information retaining apparatus 100 and the information processing apparatus 200 is started, authentication whether the communication can be conducted is made by using an encryption key according to a publicly-known method.

According to such a constitution, only necessary information can be displayed according to a scene where the information retaining apparatus 100 is used. For example, the following case is assumed. The information processing apparatus 200 is installed in a store B in a station A and the information retaining apparatus 100 is an IC card which retains points (money) usable at the time of purchasing products in the store B. In this case, the station A is specified as specific facility information and the store B is specified as specific equipment information by determination information transmitted from the request unit 204 of the information processing apparatus 200. Therefore, the determination processing unit 104 extracts only information relating to the store B in the station A from a lot of information stored in the storage unit 110 so as to display it on the display unit 102. Therefore, even when the information retaining apparatus 100 retains a lot of information, the user can recognize only the related information by means of the display unit 102 at the time of utilizing the store B in the station A. As a result, convenience at the time of using the information retaining apparatus 100 which stores a lot of information can be greatly heightened.

When the store B in the station A is utilized, the user can specify the station A as the specific facility information and specify the store B as the specific equipment information by means of input through the input section 108. As a result, the information retaining apparatus 100 can autonomously extract only information relating to the store B in the station A from a lot of information stored in the storage unit 110 so as to display it on the display unit 102. Therefore, before actually utilizing the information retaining apparatus 100 in the tore B, the user can check displayed various information such as an expiration date.

In this embodiment, the input unit 108 is provided to the information retaining apparatus 100, but the input unit such as a keyboard may be connected to the outside of the information retaining apparatus 100 so that input into the determination processing unit 104 may be carried out. The determination processing unit 104 may be provided to the information processing apparatus 200, and information may be transmitted and received from the determination processing unit provided to the information processing apparatus 200 to/from the storage unit 110 via the communication medium 300.

FIGS. 3A to 3D illustrate information extracted in the temporary storage unit of the determination processing unit 104 based on the request in the determination information transmitted from the request unit 204 or the request input from the input unit 108. As shown in FIG. 3A, information about equipment X in a facility A, information about equipment Y in the facility A, and information about equipment Z in a facility B are extracted based on the request. In FIG. 3, the expiration dates are arranged in ascending order such as DATE 1, DATE 2 and DATE 3.

In FIG. 3A, the current dates do not reach the expiration dates DATE 1 to DATE 3, and all the expiration dates DATE 1 to DATE 3 are valid. In the case of FIG. 3A, a request for reading the information about the equipment X in the facility A, the information about the equipment Y in the facility A and the information about the equipment Z in the facility B is output from the request unit 204 or the input unit 108 to the determination processing unit 104. The determination processing unit 104 extracts only data whose availability is valid (availability information=1) and whose expiration date is valid into the temporary storage unit from corresponding information.

The determination processing unit 104 checks the expiration dates of the extracted information, and rearranges the information in increasing order of time difference between the current dates transmitted from the request unit 204 or the input unit 108 and the expiration dates. Since DATE 1, DATE 2 and DATE 3 are arranged in ascending order, as shown in FIG. 3B, the information are rearranged in the temporary storage unit in ascending order of the expiration dates. When the extracted information are arranged in order of the expiration dates, the user can easily understand the expiration dates of the information at the time of displaying the information. The information which are arranged in order of the expiration dates may be written into the storage unit 110.

FIG. 3C illustrates respective information when the expiration date of the equipment X in the facility A expires. In this case, an attribute of the equipment X in the facility A is an attribute for display even after the expiration date (attribute 1). For this reason, the state of the storage unit 110 does not change except that the availability information is changed into unavailable (=0).

Therefore, the information which exceeds its expiration date remains in the storage unit 110 in the state that the availability information is changed into unavailable (=0). For this reason, when the equipment X in the facility A is desired to be reused, the use can be restarted only by rewriting the availability information from 0 into 1. As a result, when the information which exceeds its expiration date is reactivated and reused, a processing amount and a transmission data amount (time lag) can be repressed to minimum.

FIG. 3D illustrates the respective information when the expiration date of the equipment Z in the facility B expires. In this case, the attribute information about the equipment Z in the facility B is attribute (attribute 2) for erasing information after the expiration date. For this reason, as shown in FIG. 3D, the information about the equipment Z in the facility B is erased from the storage unit 110, and is not extracted in the temporary storage unit. As a result, a free area in the storage unit 110 can be increased.

FIGS. 4A and 4B are pattern diagrams illustrating states that the information extracted in the temporary storage unit are displayed on the display unit 102 and display unit 208. Information about available facilities and equipment retained in the temporary storage unit shown in FIGS. 3A to 3D are displayed on the display units 102 and 208 as the need arises. For example, the information which are rearranged in order of the expiration dates shown in FIG. 3B is displayed on the display units 102 and 208 in this state. When the information of FIG. 3C is displayed on the display units 102 and 208, since the equipment X in the facility A can be hardly used due to its expiration date, as shown in FIG. 4A, only the information other than the information about the equipment X in the facility A is displayed on the display unit 102. That is to say, the information about the equipment X in the facility A is stored in the storage unit 110 and is extracted in the temporary storage unit, but is not displayed on the display units 102 and 208. At the time of display, the information is sequentially displayed one by one or collectively according to a restriction of the number of display characters on the display unit 102.

When the user desires to display all the information retained in the temporary storage unit regardless of validity/invalidity of the facilities and equipment, all the information extracted in the temporary storage unit is displayed regardless of a value of the availability information. For example, when the information about all the facilities and equipment extracted in the temporary storage unit is displayed in the state of FIG. 3C, as shown in FIG. 4B, all the information in FIG. 3 is read so as to be displayed on the display units 102 and 208. A state whether only the information about available facility and equipment is displayed like FIG. 4A or all the information retained in the temporary storage unit is displayed is set according to a request from the request unit 208 or an input from the input unit 108. The determination processing unit 104 executes a process for displaying all the data in the storage unit 110 according to the a request from the request unit 208 or input from the input unit 108.

In this embodiment, the attribute information is set to 1 so that the information which exceeds the expiration date can be stored in the storage unit 110. Therefore, for example, when equipment is replaced, namely, when the use mode frequently changes, information which exceeds the expiration date can be reused only by a minimum process because the information remains in the storage unit 110. When a user uses specific equipment on a temporary basis, the attribute information is set to 2. As a result, since information which exceeds the expiration date can be erased from the storage unit 110, useless data does not remain in the storage unit 110, so that the area can be effectively utilized.

The determination processing unit 104 rewrites the validity information based on the expiration date and a current date, but when the current date reaches the expiration date, an alert may be issued. For example, when a difference between the expiration date and the current date is not more than a specific period, the determination processing unit 104 may display an alert on the display unit 102.

A procedure of the process in the information processing system in this embodiment is described below based on a flow chart of FIG. 5. This flow chart shows the process for displaying information read from the information retaining apparatus 100 according to a request from the information processing apparatus 200. The information processing apparatus 200 transmits an information reading instruction to the information retaining apparatus 100 at step S1. The information reading instruction includes the determination information, and the determination information includes the information about specific facility and specific equipment read into the temporary storage unit in the information stored in the storage unit 110 of the information retaining apparatus 100. The information retaining apparatus 100 receives the information reading instruction at step S2.

The memory number N is set to a head number, and information about the memory number N is read from the information stored in the storage unit 110 at step S3. A determination is made at step S4 whether the data of number N is information about specific facility and specific equipment included in the determination information. When the data is the information about the specific facility and equipment, the process goes to step S5. On the other hand, when the data of number N is not the information about specific facility and equipment, the process goes to step S11 so that the value of N is incremented and the determination at step S4 is made.

A determination is made whether the data of number N exceeds the expiration date at step S5. When the expiration date expires, the process goes to step S6, so that an attribute of the data of number N is determined, and a determination is made whether the attribution is an attribute (attribute=2) such that the information is erased after the expiration date. On the other hand, when the expiration date does not expire at step S5, the process goes to step S9.

When the attribute of the data of number N is the attribute (attribute=2) such that the information is erased after the expiration date, the process goes to step S7, so that the data of number N in the storage unit 110 is erased. On the other hand, when the attribute of the data of number N is an attribute (attribute=1) such that the information is allowed to remain after the expiration date at step S6, the process goes to step S8, so that the availability information about the data of number N is changed into unavailable.

The data of number N is developed in the temporary storage unit at step S9.

A determination is made whether the data of number N is the last data at step S10. When the data of number N is the last data, the process goes to step S12. On the other hand, the data of number N is not the last data, the value of N is incremented at step S11, and the process returns to step S4.

In the process at steps S1 to S11, the information about the specific facility and equipment included in the determination information is extracted from the storage unit 110, and is developed in the temporary unit of the determination processing unit 104.

After step S12, the information extracted in the temporary storage unit is processed so that information to be displayed on the display units 102 and 208 is controlled. A determination is made at step S12 whether the information reading instruction is an instruction for displaying only valid information, namely, whether this instruction is an instruction for displaying only information about available facility and equipment. When the instruction is for displaying only the valid information, the process goes to step S13. On the other hand, when the information reading instruction is not the instruction for displaying only the valid information at step S12, namely, the instruction is an instruction for displaying all the information about corresponding specific facilities and equipment, the process goes to step S16.

A determination is made at step S13 whether the availability of all the data in the temporary storage unit is valid. That is to say, a determination is made whether the availability information indicates 1. When data whose availability is invalid is present, the process goes step S15, and the data whose availability is invalid is erased from the temporary storage unit. On the other hand, when the availability of all the data is valid, the step goes to step S14.

A determination is made at step S14 whether the expiration dates of all the data in the temporary storage unit are valid. When the data which exceeds expiration dates are present, the process goes to step S15, and the data which exceeds expiration dates is erased from the temporary storage unit. On the other hand, when all the data do not exceed the expiration dates, the process goes to step S16.

The data in the temporary storage unit are rearranged in order of the expiration dates at step S16. The data in the temporary storage unit are displayed on the display unit 102 at step S17. The display contents are transmitted to the information processing apparatus 200 at step S18. The information processing apparatus 200 which receives the display contents displays the data in the temporary storage unit on the display unit 208.

According to this embodiment, only information relating to specific facility and equipment in a lot of information stored in the storage unit 110 is extracted in the temporary storage unit of the determination processing unit 104 based on the request from the request unit 204 of the information processing apparatus 200 or the request from the input unit 104 of the information retaining apparatus 100 so as to be displayed on the display units 102 and 208. Therefore, only necessary information can be displayed according to scenes where the information retaining apparatus 100 is used, and the determination can be securely made whether the displayed information exceeds the expiration date.

The information retained in the storage unit 110 is not erased even when the its expiration date expires and is stored in the storage unit 110 according to its attribute information. Therefore, when the information whose expiration date expires is desired to be reused, the reusing process and the transmission data amount can be repressed to minimum.

It should be understood by those skilled in the art that various modifications, combinations, sub-combinations and alterations may occur depending on design requirements and other factors insofar as they are within the scope of the appended claims or the equivalents thereof.

What is claimed is:

1. An information retaining apparatus comprising:
    a storage unit which retains a plurality of pieces of information comprising
        facility information indicating facilities in which the information retaining apparatus is used,
        equipment information indicating equipments at which the information retaining apparatus is used, the equipments being located in the facilities,
        availability information indicating whether the facilities and the equipments are available based on expiration dates, and
        attribute information indicating whether the pieces of information are allowed to be displayed after the expiration dates; and
    a determination processing unit which extracts at least some of the plurality of pieces of information retained in the storage unit so as to display it according to determination information input by a user or determination information transmitted from an information processing apparatus connected to the information retaining apparatus via a communication medium, and processes the extracted information based on the availability information and the attribute information.

2. The information retaining apparatus according to claim 1, further comprising a display unit which executes display based on the processed result of the determination processing unit.

3. The information retaining apparatus according to claim 1, wherein the determination processing unit determines an order of display based on the expiration dates of the pieces of information.

4. The information retaining apparatus according to claim 1, wherein the determination processing unit executes the process so that information which exceeds their expiration dates in the information extracted according to the determination information is not displayed.

5. The information retaining apparatus according to claim 1, wherein the determination processing unit executes a process for displaying an alert when a current date reaches predetermined periods within the expiration dates of the pieces of information.

6. The information retaining apparatus according to claim 1, wherein the determination processing unit changes a storage state of the pieces of information in the storage unit according to the information processed result.

7. The information retaining apparatus according to claim 6, wherein the determination processing unit determines whether information which exceeds their expiration date expires is allowed to remain in the storage unit based on the attribute information.

8. The information retaining apparatus according to claim 1, further comprising a communication unit which transmits the processed result in the determination processing unit to the information processing apparatus.

9. An information processing system in which an information retaining apparatus and an information processing apparatus are connected via a transmittable/receivable communication medium, wherein
the information retaining apparatus includes:
a communication unit which communicates with the information processing apparatus via the communication medium;
a storage unit which retains a plurality of pieces of information comprising
facility information indicating facilities in which the information retaining apparatus is used,
equipment information indicating equipments at which the information retaining apparatus is used, the equipments being located in the facilities,
availability information indicating whether the facilities and the equipments are available based on expiration dates, and
attribute information indicating whether the pieces of information are allowed to be displayed after the expiration dates; and
a determination processing unit which extracts at least some of the plurality of pieces of information retained in the storage unit so as to display it according to determination information transmitted from the information processing apparatus, and processes the extracted information based on the availability information and the attribute information,
the information processing apparatus includes:
a request unit which generates the determination information; and
a communication unit which transmits the determination information to the information retaining apparatus.

10. The information processing system according to claim 9, wherein:
the communication unit of the information processing apparatus receives the processed result of the determination processing unit from the information retaining apparatus, and
the information processing apparatus has a display unit which executes display according to the processed result of the determination processing unit.

11. An information processing method in an information retaining apparatus, comprising the steps of:
retaining, in a storage unit, a plurality of pieces of information comprising
facility information indicating facilities in which the information retaining apparatus is used,
equipment information indicating equipments at which the information retaining apparatus is used, the equipments being located in the facilities,
availability information indicating whether the facilities and the equipments are available based on expiration dates, and
attribute information indicating whether the pieces of information are allowed to be displayed after the expiration dates;
receiving an input from a user; and
extracting at least some of the plurality of pieces of information retained in the storage unit to display it according to determination information input by the user or determination information transmitted from an information processing apparatus connected to the information retaining apparatus via a communication medium, and processing the extracted information based on the availability information and the attribute information.

12. A non-transitory computer-readable storage medium storing instructions, when executed on a computer system, allowing an information retaining apparatus to function as:
a retaining unit retaining a plurality of pieces of information comprising
facility information indicating facilities in which the information retaining apparatus is used,
equipment information indicating equipments at which the information retaining apparatus is used, the equipments being located in the facilities,
availability information indicating whether the facilities and the equipments are available based on expiration dates, and
attribute information indicating whether the pieces of information are allowed to be displayed after the expiration dates; and
a extracting unit extracting at least some of the plurality of pieces of information retained in the storage unit to display it according to determination information input by a user or determination information transmitted from an information processing apparatus connected to the information retaining apparatus via a communication medium, and processing the extracted information based on the availability information and the attribute information.

* * * * *